Figure 1:
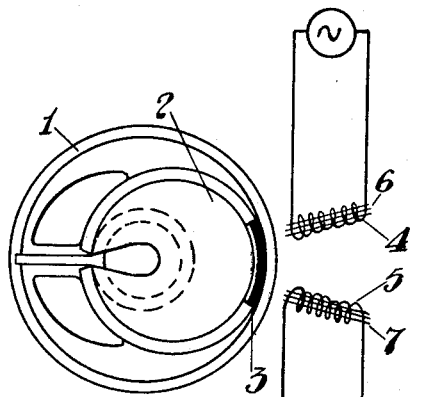

June 26, 1962 R. L. SMITH 3,040,578
FLUID FLOW METERS
Filed Nov. 16, 1959

Inventor
R. L. Smith
By Glascock Downing & Seebold
Attys

United States Patent Office 3,040,578
Patented June 26, 1962

3,040,578
FLUID FLOW METERS
Reginald Lewis Smith, Oldham, England, assignor to Parkinson Cowan Limited, London, England, a company of Great Britain
Filed Nov. 16, 1959, Ser. No. 853,395
Claims priority, application Great Britain Nov. 24, 1958
3 Claims. (Cl. 73—257)

Fluid meters of the conventional type comprise a meter chamber containing a measuring member which rotates or oscillates, driving through appropriate gears or mechanism a dial, from which the total quantity of fluid, liquid or gas, which has passed through the meter can be read. The measuring member is usually moved by the action of the fluid going through the meter. In a liquid meter, the measuring member may be a rotating piston or wobble disc, or a reciprocating piston, which measures the volume of the liquid going through the measuring chamber, or it may be a fan or helix wheel rotating proportionally to the flow of the liquid. In a gas meter the measurement may be effected by means of bellows or by means of a fan in a housing.

In most cases the movement imparted by the fluid to the measuring member has to be transmitted mechanically to some form of indicator which is normally contained in a housing separate from the fluid and it is therefore necessary for a rotating member to pass through a stuffing box, which acts as a seal between the chamber containing the fluid and the housing for the indicator. This seal, plus the transmitting mechanism, absorbs a certain amount of energy when the meter is driven which impairs the accuracy of the measuring element, particularly at low flow. It will also be seen that with such a meter of the mechanical type, reading of the volume passing through the meter can only be made on site, i.e. in the vicinity of the meter within the distance limitations of mechanical drives. Remote indication devices fitted to the index mechanism and transmitting impulses proportional to the metered indication, are known, but such devices being driven from a point moving more slowly than the measuring member do not provide sufficient impulses to enable small increments of volume to be metered readily.

The object of the present invention is to provide means whereby the load imposed on the measuring element is reduced, and at the same time, to provide a convenient means of placing the indicator at any convenient distance remote from the meter. A further object is to provide means enabling small increments of volume to be metered readily.

According to the invention a fluid meter arrangement comprises a measuring chamber, a measuring member which rotates or oscillates in accordance with the quantity of fluid flowing through the meter and means external to, but adjacent to, the measuring chamber, including two devices, the magnetic or electrical coupling between which is varied in accordance with the relative position of the measuring member.

The two devices may be two coils, the measuring member then being magnetic, or carrying a magnetic piece, which provides a substantial increase in the magnetic coupling between the coils at its closest approach thereto.

Alternatively the two devices may be two capacitor plates, the capacitance between which is varied during movement of the measuring member. In this case the measuring chamber at least in the vicinity of the capacitor plates, must be of insulating material.

Referring to the accompanying drawing:
FIGURE 1 is a schematic diagram of an embodiment of the invention utilising magnetic coupling, and
FIGURE 2 is a schematic diagram of another embodiment utilising capacitative coupling.

The rotary meter shown comprises a non-magnetic measuring chamber 1 and a rotary piston 2 in the wall of the latter of which is inserted a soft iron plate 3. Alternatively plate 3 may be replaced by a small bundle of soft iron wires. Two coils 4 and 5 which preferably have soft iron cores 6 and 7 respectively, are situated at convenient points on the outside of the wall of the measuring chamber 1. Coil 6 is energised by some convenient alternating current source such as the mains supply. The coils are so placed that the magnetic coupling between them and consequently the current induced in the coil 7, is a minimum, except when the soft iron core 3, embedded in the rotor, passes between them. When this happens, the core member acts as a magnetic link between the two coils and an increased current is induced in the coil 7 which, after amplification by known electronic or magnetic means 8, is used to drive an electro-magnetic counter 9 or like indicator. In order to obtain more than one impulse per revolution of the rotating member and consequently to decrease the size of the increment of volume which may be measured, more than one coil assembly and core member may be fitted to the measuring chamber and measuring member respectively. Such a device could be fitted to any other type of rotating or oscillating measuring member providing the same effect as described above.

Figure 2:
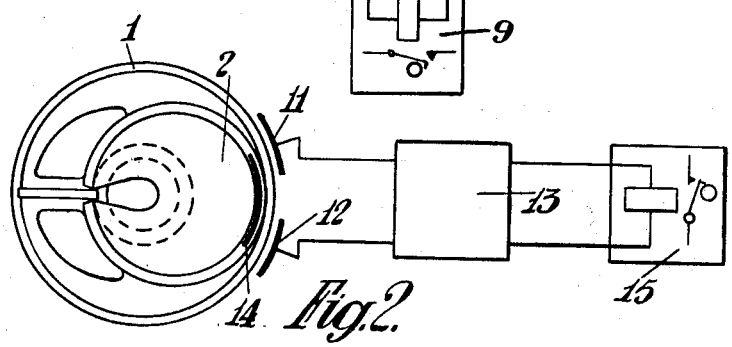

In another embodiment of the invention shown in FIGURE 2 capacitative coupling is utilised instead of magnetic coupling and may be used only where the wall of the measuring chamber is made of an electrical insulating material. In this case, the two coils are replaced by two conductors 11 and 12 not in electrical contact, which conductors form the two plates of a capacitor. When the measuring member 2 of the meter takes up a position within the measuring chamber such that it bridges the gap between the two plates 11 and 12, a change in capacitance occurs compared with that when the member is remote from the plates. This change in capacitance can, by known detecting means 13, be used to produce a signal which will enable the rotations or excursions of the member to be counted on counter 15.

The requirement is that the measuring member or that part of it which becomes adjacent to the plates, shall have a substantially different dielectric constant from that of the fluid being measured. This may be achieved either by making the complete member 2 of a material having such a property or by inserting a piece (as shown dotted at 14) of such material at an appropriate place in the member 2.

By providing means in accordance with the invention it is possible to do away completely with the mechanical transmissions, be it sets of gears or link devices, which are normally fitted to such meters to transmit the motion to a suitable indicator. This advantage enables the production of a more compact meter, and as previously indicated, a more accurate and more sensitive meter, particularly at low flows. The use of A.C. energisation rather than D.C. energistation or permanent magnets has the advantage that the amplitude of the induced pulse does not vary with the speed of the measuring member.

I claim:
1. A rotary piston type fluid meter comprising a measuring chamber having a non-magnetic wall, a measuring piston within said chamber which piston rotates in accordance with the quantity of fluid passing through said chamber, a first coil mounted external to but adjacent said chamber and adapted to be energised from an A.C. source, a second coil mounted external to but adjacent said chamber and also adjacent said first coil, and means connected to said second coil for detecting the output thereof, said measuring piston being at least in part of magnetic mate- rial which provides a substantial increase in the magnetic coupling between said two coils at its closest approach thereto.

2. A rotary piston type fluid meter comprising a measuring chamber having a non-magnetic wall, a measuring piston within said chamber which piston rotates in accordance with the quantity of fluid passing through said chamber, a first coil mounted external to but adjacent said chamber and adapted to be energised from an A.C. source, a second coil mounted external to but adjacent said chamber and also adjacent said first coil, but arranged for minimum direct magnetic coupling therewith and means connected to said second coil for detecting the output thereof, said measuring piston carrying a magnetic piece which provides a substantial increase in the magnetic coupling between said two coils at its closest approach thereto.

3. A meter as claimed in claim 1 wherein said detecting means includes an amplifier which amplifies the output from said second coil and feeds it to a counter.

References Cited in the file of this patent
UNITED STATES PATENTS

| | | |
|---|---|---|
| 2,467,582 | Corkran | Apr. 19, 1949 |
| 2,683,224 | Cole | July 6, 1954 |
| 3,002,384 | MacDonald et al. | Oct. 3, 1961 |

FOREIGN PATENTS

| | | |
|---|---|---|
| 803,069 | Great Britain | Oct. 15, 1958 |
| 804,333 | Great Britain | Nov. 12, 1958 |